Aug. 26, 1930. W. LINNMANN, JR Re. 17,776

APPARATUS FOR SEPARATING LIQUIDS OF DIFFERENT SPECIFIC GRAVITIES

Original Filed Nov. 22, 1926 2 Sheets-Sheet 1

INVENTOR
Wilhelm Linnmann Jr.

BY C. F. Goepel

His ATTORNEY

Aug. 26, 1930. W. LINNMANN, JR. Re. 17,776

APPARATUS FOR SEPARATING LIQUIDS OF DIFFERENT SPECIFIC GRAVITIES

Original Filed Nov. 22, 1926 2 Sheets-Sheet 2

INVENTOR
Wilhelm Linnmann, Jr.
BY C. F. Wegel
his ATTORNEY

Reissued Aug. 26, 1930 Re. 17,776

UNITED STATES PATENT OFFICE

WILHELM LINNMANN, JR., OF ESSEN-ALTENESSEN, GERMANY

APPARATUS FOR SEPARATING LIQUIDS OF DIFFERENT SPECIFIC GRAVITIES

Original No. 1,671,115, dated May 29, 1928, Serial No. 149,851, filed November 22, 1926, and in Germany January 28, 1926. Application for reissue filed May 29, 1930. Serial No. 457,432.

My invention relates to improvements in apparatus for separating liquids of different specific gravities, and more particularly in apparatus for separating light liquids from waste-water, in which the outlet is adapted to be automatically closed by means of a float valve as soon as a certain amount of liquid of low specific gravity such as benzol has been collected on the surface of the liquid of higher specific gravity such as waste-water. Thereby the attendant is forced to tap off the light liquid in good time and before the said light liquid is discharged through the outlet. The object of the improvements is to provide an apparatus of this class which is simple in construction and reliable in operation, and with this object in view my invention consists in providing a tank having an inlet and an outlet, the said outlet being directed upwardly within the tank and adapted to be closed by a valve disk connected with a floating hood surrounding the inlet end of the outlet. Thus while the layer of benzol collected on the surface of the water is thin, the valve disk is held a certain distance away from the inlet end of the outlet pipe, and when a thick layer of benzol has collected on the top of the water the floating hood sinks into the said benzol by reason of the reduced specific gravity of the medium in which it is immersed, until finally the valve disk is seated on the inlet end of the outlet and the delivery of waste-water is prevented.

Other objects of the improvements will be understood from the following description.

Figure 2:
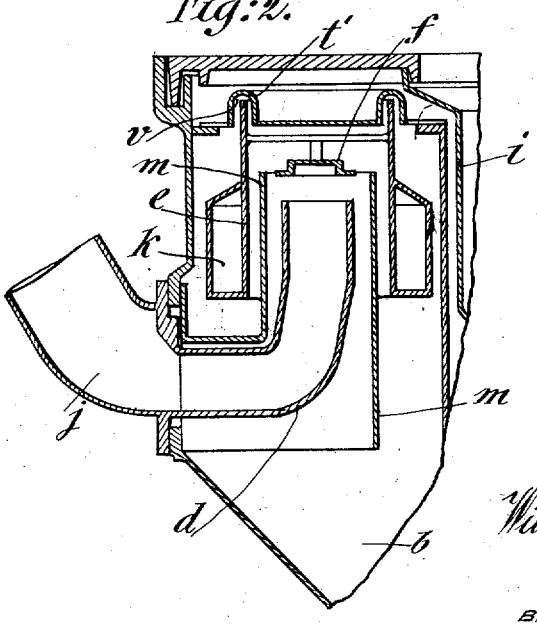
Figure 3:
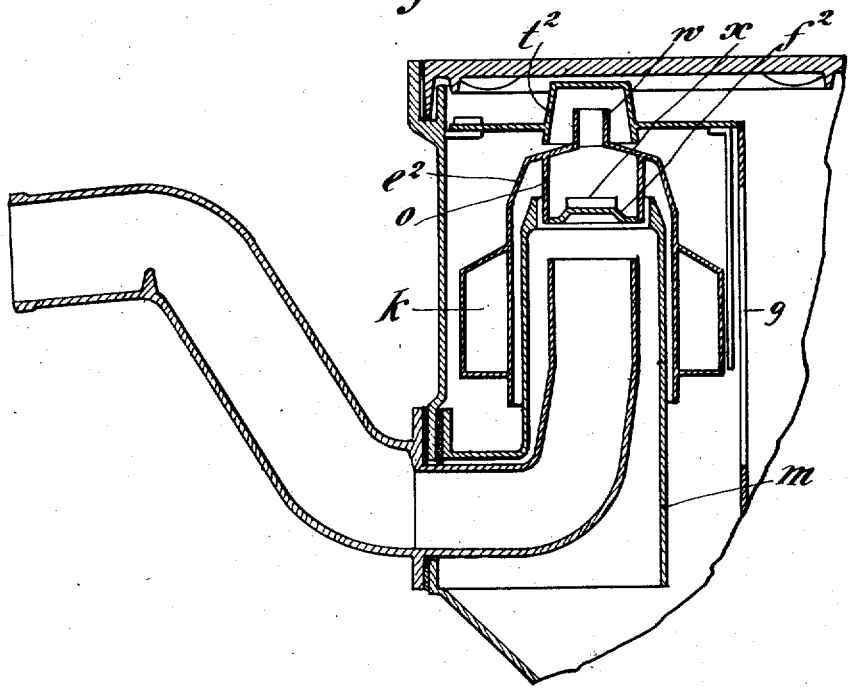

For the purpose of explaining the invention several examples embodying the same have been shown in the accompanying drawings, in which the same letters of reference have been used in all the views to indicate corresponding parts. In said drawings, Fig. 1 is a sectional elevation showing the apparatus, Fig. 2 is a partial sectional elevation showing a modification, and Fig. 3 is a partial sectional elevation showing another modification.

Figure 1:
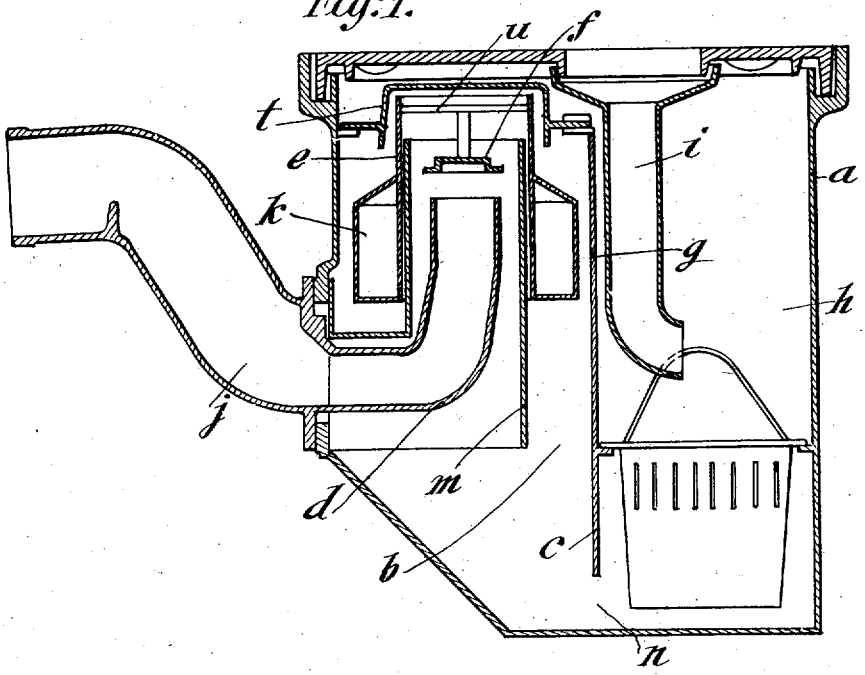

In the example shown in Fig. 1 my improved separating apparatus comprises a tank *a* divided by a vertical partition *c* having in its upper part an opening *g* into two chambers *b* and *h* communicating with each other at the bottom of the tank and through the opening *g*. The chamber *h* is provided with an inlet pipe *i*, and the chamber *b* with an outlet pipe *j*, the outlet pipe *j* having an inner portion *d* directed upwardly. The portion *d* of the outlet pipe is surrounded by a tubular member *m* which is open at its top and bottom, and which is surrounded by a pipe *e* constructed at its bottom end in the form of an annular float *k*. To a bar *u* fixed to or made integral with the pipe *e* a valve disk *f* is secured which is in position for closing the inlet end of the pipe section *d*. The top part of the pipe *e* extends into a fixed hood *t*.

In the operation of the apparatus the waste-water having benzol admixed thereto is delivered into the chamber *h* of the tank through the pipe *i*, and it rises within the said chamber so far that the passage *n* through which the chambers *b* and *h* communicate with each other is closed. Thus the benzol is separated from the water within the chamber *h*, and there is only waste-water and no benzol within the chamber *b*. After a while the water within the chamber *b* closes the tubular member *m* at its bottom and thereafter the level of the liquid rises to a point above the bottom end of the opening *g*. Now the benzol collected on the surface of the water flows into the chamber *b*. By the further rising of the water the float *k* will float within the said liquid and raise the valve disk *f* from its seat on the pipe *d*, whereupon the waste-water is discharged through the pipe *d*, *j*. It will be noted however, that no benzol is discharged, because the liquid is supplied to the tubular member *m* inclusively from the bottom thereof. At the beginning of the operation the level of the liquid will not rise above the inlet end of the pipe *d*. But when the layer of benzol collected on the surface of the water is increased, the level of the benzol within the part of the chamber *b* outside the tubular member *m* will rise, while the level of the water within the tubular member *m* will not rise above the inlet end of the pipe *d*, by reason of the different specific gravities of the liquids. After some time the benzol rises so far that it closes the hood $t$ at its bottom end, whereupon the air confined within the said hood is compressed and the rising of the benzol to the top of the pipe $e$ is prevented. Further, the float $k$, which is now immersed into a liquid of lower specific gravity, sinks so far that the disk $f$ closes the pipe section $d$, whereupon the discharge of water is interrupted. The water will rise above the disk $f$ and force the same downwardly and on its seat.

Now the benzol is tapped off, whereupon water from the tubular member $m$ flows into the outer part of the chamber $b$, so far that the float $k$ has again the tendency to raise the disk $f$ from its seat. By tapping off the benzol, communication between the inner part of the pipe $e$ with the outer air is again established, and further the air will gradually flow between the valve $f$ and the pipe $d$, so that the float $k$ can readily raise the valve disk $f$ from its seat, whereupon the discharge of the waste-water through the pipe $d$ is continued.

It will be understood from the foregoing that the tubular member $m$, is essential only when the float $k$ may be removed in order to prevent the benzol from entering the outlet tube $d$. In case however, it should be desired or a municipal ordinance should require that the closure or hood $t$ be sealed in place, the tubular member $m$ then becomes unnecessary and can be omitted since the tubular part $e$ of the float at all times operates to prevent any flow of the benzol into the outlet tube $d$.

In Fig. 2 I have shown a modification in which the top plate of the hood $t^1$ is depressed downwardly and into the top part of the pipe $e$. Thereby the function of the hood preventing the flow of benzol above the top part of the pipe $e$ is further improved. Otherwise the construction of the apparatus is the same as that described with reference to Fig. 1, and the same letters of reference have been used to indicate corresponding parts.

In the modification shown in Fig. 3 the pipe $e^2$ connected with the float $k$ ends at its top into a portion $w$ of reduced diameter surrounded by a hood $t^2$ of comparatively small diameter. Further, the valve disk $f^2$ is connected with the pipe $e^2$ by means of a tubular portion $o$ formed with one or more openings $x$ through which the waste-water has access to the part above the valve disk $f^2$, and the connection of the inner part of the tubular member $m$ with the outer air is established after tapping off the benzol, as has been described with reference to Fig. 1.

While in describing the invention reference has been made to particular examples embodying the same I wish it to be understood that I do not limit myself to the constructions shown in the drawings and that various changes may be made in the general arrangement of the apparatus and the construction of its parts without departing from the invention.

I claim:

1. An apparatus for separating liquids of different specific gravities, comprising a tank having an inlet and an outlet, a tubular member within said tank open at its top and bottom, a pipe connected with said outlet and extending upwardly therefrom and into said tubular member, an annular float surrounding said tubular member and extending upwardly therefrom, a valve disk carried by said float and adapted to close said pipe, and a fixed hood surrounding the top part of said float.

2. An apparatus for separating liquids of different specific gravities, comprising a tank having an inlet and an outlet in the form of a liquid seal and having an overflow, a tubular member within said tank open at its top and bottom, and having its top part located above the level of said overflow, a pipe connected with said outlet and extending upwardly therefrom and into said tubular member, an annular float surrounding said tubular member and extending upwardly therefrom, a valve disk carried by said float and adapted to close said pipe, and a fixed hood surrounding the top part of said float.

3. An apparatus for separating liquids of different specific gravities, comprising a tank having an inlet and an outlet, a tubular member within said tank open at its top and bottom, a pipe connected with said outlet and extending upwardly therefrom and into said tubular member, an annular float surrounding said tubular member and extending upwardly therefrom and reduced in diameter at its top, a valve disk fixed to a tubular part depending from the top part of said float and into said tubular member and into position for closing said pipe, and a fixed hood surrounding the reduced top part of said float.

4. An apparatus for separating liquids of different specific gravities, comprising a tank having an inlet and an outlet, a tubular member within said tank open at its top and bottom, a pipe connected with said outlet and extending upwardly therefrom and into said tubular member, an annular float surrounding said tubular member and extending upwardly therefrom, a valve disk carried by said float and adapted to close said pipe, and a fixed hood surrounding the top part of said float, the top wall of said hood being directed downwardly and into said float.

5. An apparatus for separating liquids of different specific gravities, comprising a tank having an inlet and an outlet, a pipe connected with said outlet and extending upwardly therefrom into the tank, an annular float surrounding said pipe and extending upwardly therefrom, a valve disk carried by said float and adapted to close said pipe, and a fixed hood surrounding the top part of said float.

In testimony that I claim the foregoing as my invention, I have signed my name hereto.

WILHELM LINNMANN, Jr.